//www.patentsoft.com

United States Patent [19]
Saito et al.

[11] Patent Number: 4,709,774
[45] Date of Patent: * Dec. 1, 1987

[54] MOTORCYCLE

[75] Inventors: Naoyuki Saito; Motoo Ozawa, both of Saitama, Japan

[73] Assignee: Honda Giken Kogyo Kabushiki Kaisha, Tokyo, Japan

[*] Notice: The portion of the term of this patent subsequent to Feb. 18, 2003 has been disclaimed.

[21] Appl. No.: 888,635

[22] Filed: Jul. 25, 1986

Related U.S. Application Data

[63] Continuation of Ser. No. 654,786, Sep. 26, 1984, abandoned.

[30] Foreign Application Priority Data

Sep. 26, 1983 [JP] Japan ............................ 58-148610[U]

[51] Int. Cl.[4] ...................... B60K 11/04; B60K 11/08
[52] U.S. Cl. .................................. 180/229; 180/68.1; 280/289 S; 296/78.1; D12/110
[58] Field of Search .................... 180/229, 22 J, 219, 180/68.1, 68.4, 903; 280/289 S; 165/41, 44, 67; D12/110, 118; 296/1 S, 78.1

[56] References Cited

U.S. PATENT DOCUMENTS

| | | | |
|---|---|---|---|
| 4,171,729 | 10/1979 | Shibata | 180/229 |
| 4,354,570 | 10/1982 | Tanaka et al. | 180/225 |
| 4,396,086 | 8/1983 | Hattori | 180/229 |
| 4,413,700 | 11/1983 | Shiratsuchi | 180/219 |
| 4,428,451 | 1/1984 | Yamaoka | 180/229 |
| 4,438,828 | 3/1984 | Nakugawa | 180/219 |
| 4,441,547 | 4/1984 | Argyle et al. | 180/68.1 |
| 4,564,081 | 1/1986 | Hamane | 180/229 |
| 4,570,740 | 2/1986 | Hara | 180/229 |

FOREIGN PATENT DOCUMENTS

| | | | |
|---|---|---|---|
| 21657 | 1/1981 | European Pat. Off. | 180/229 |
| 347314 | 1/1922 | Fed. Rep. of Germany | 180/68 |
| 0128924 | 8/1983 | Japan | 180/229 |

*Primary Examiner*—John J. Love
*Assistant Examiner*—Mitchell J. Hill
*Attorney, Agent, or Firm*—Irving M. Weiner; Joseph P. Carrier; Pamela S. Burt

[57] ABSTRACT

A motorcycle having a fairing and a radiator. The motorcycle includes a head pipe fixedly mounted on a front end of a motorcycle frame and inclined rearwardly with respect to a vertical line, a radiator disposed forwardly of the head pipe substantially parallel to an axis thereof and positioned in a plane lying normally to the longitudinal axis of a motorcycle body, and an instrument cluster unit disposed in a slanted plane extending upwardly and forward from above the radiator. A headlight is disposed in a recess defined between the instrument cluster unit and the radiator and having a substantially V shape as viewed in side elevation. A fairing covers the headlight, the radiator, and the instrument cluster unit.

12 Claims, 14 Drawing Figures

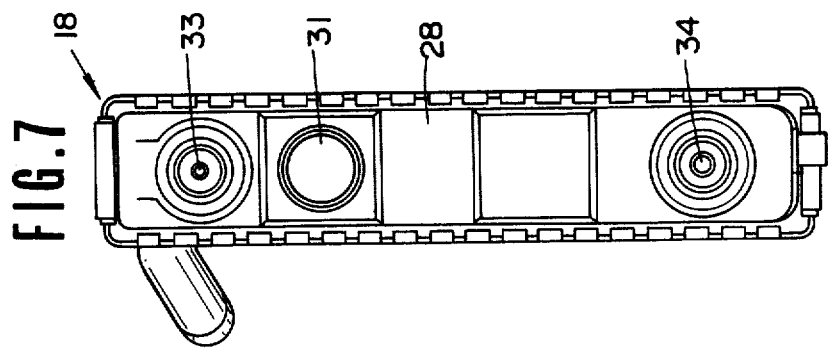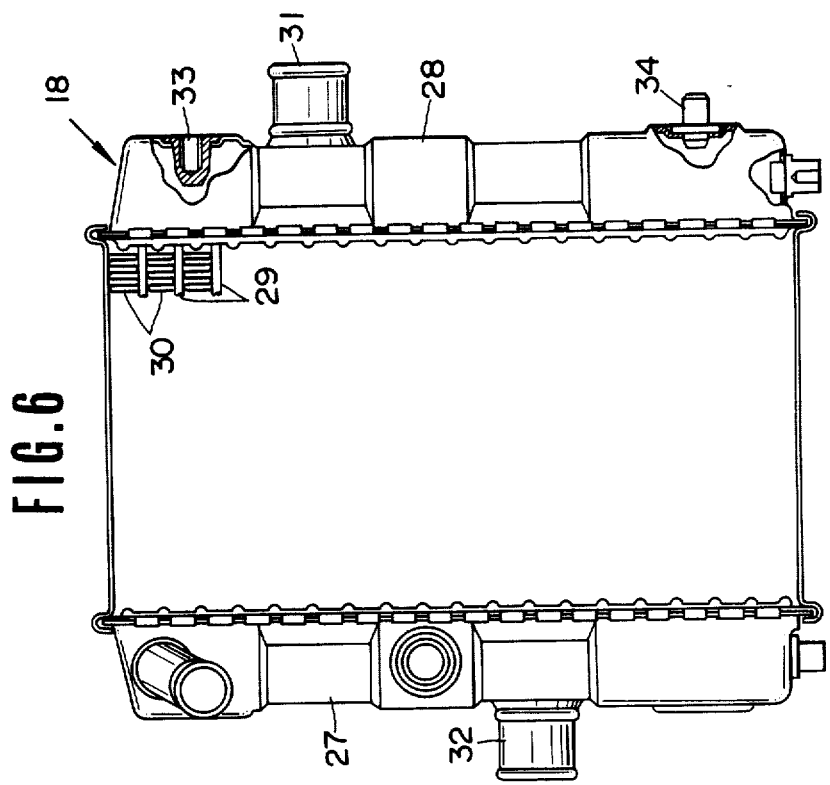

MOTORCYCLE

This is a continuation of application Ser. No. 654,786, filed Sept. 26, 1984, now abandoned.

BACKGROUND OF THE INVENTION

1. Field of the Invention

The present invention relates to a motocycle, and more particularly to a motorcycle having a fairing and a radiator.

2. Description of the Prior Art

Many modern motocycles have a fairing mounted on a front portion of a motorcycle body in surrounding relation to a headlight for improved aerodynamic characteristics, and a water-cooled engine for producing a high power output. One such known motorcycle includes a radiator mounted on the front of a down tube extending downwardly from a head pipe on a front end of the motorcycle frame, with the fairing extending from the headlight toward lateral sides of a fuel tank. Where the radiator and a piping serving as a passage for a coolant liquid project laterally of the motorcycle frame or have a large area within a plane lying normally to the longitudinal axis of the motorcycle body, the radiator and piping present an increased resistance to an air flow with resultant poor aerodynamic characteristics, and result in an unsightly appearance.

SUMMARY OF THE INVENTION

With the above drawbacks attendant conventional arrangements in view, it is an object of the present invention to provide a motocycle having a water-cooled engine and a fairing surrounding a headlight, wherein a radiator and a piping interconnecting the radiator and the engine do not project laterally of a motorcycle body and do not have an exposed portion which has an increased area within a plane lying normally to the longitudinal axis of the motorcycle body, thus reducing a resistance to an air flow and allowing an improved appearance of the motorcycle.

According to the present invention, the above object can be accomplished by a motorcycle including a motorcycle body having a longitudinal axis, a motorcycle frame, a head pipe fixedly mounted on a front end of the motorcycle frame and inclined rearwardly with respect to a vertical line, a radiator disposed forwardly of the head pipe substantially parallel to an axis thereof and positioned in a plane lying normally to the longitudinal axis of the motorcycle body, an instrument cluster unit disposed in a slanted plane extending upwardly and forwardly from above the radiator, a headlight disposed in a recess defined between the instrument cluster unit and the radiator and having a substantially V shape as viewed in side elevation, and a fairing covering the headlight, the radiator, and the instrument cluster unit.

The above and other objects, features and advantages of the present invention will become more apparent from the following detailed description when read in conjunction with the accompanying drawings in which a preferred embodiment of the present invention is shown by way of illustrative example.

BRIEF DESCRIPTION OF THE DRAWINGS

FIG. 6 is a front elevational view of a radiator.

FIG. 7 is a side elevational view of the radiator of FIG. 6.

DETAILED DESCRIPTION OF THE PREFERRED EMBODIMENT

Figure 1:
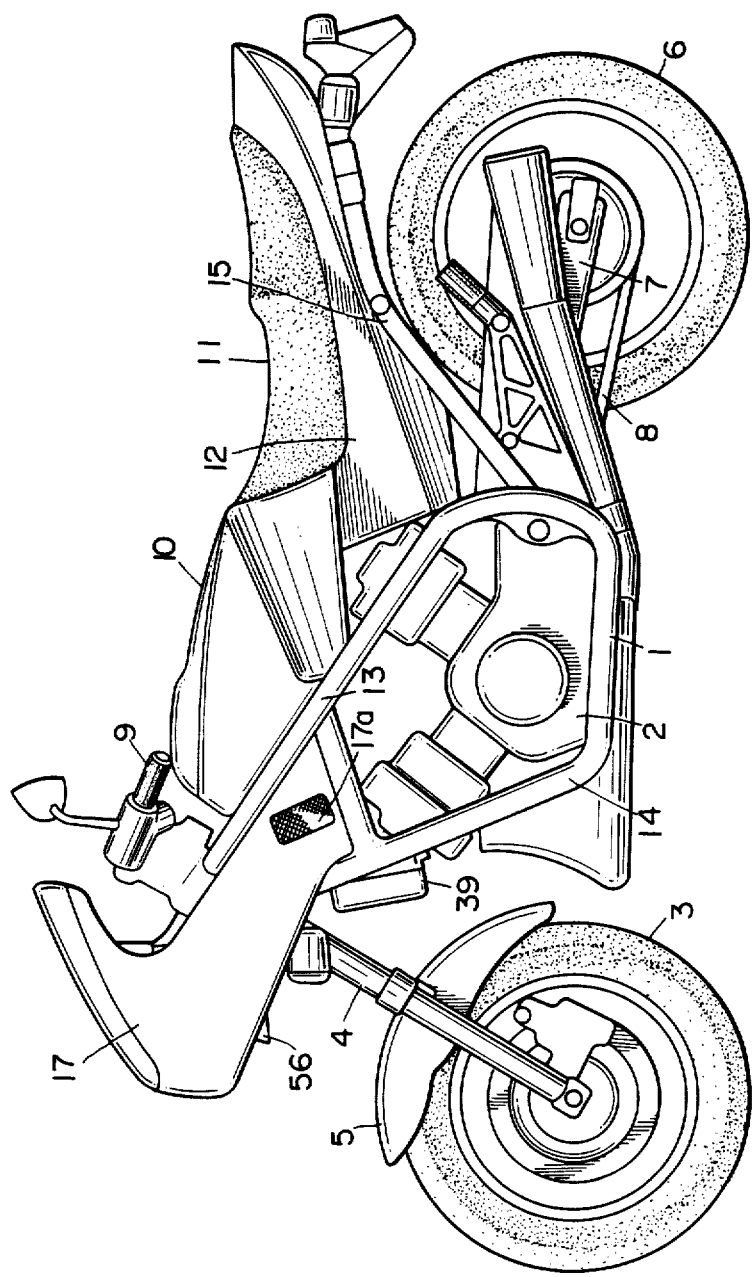
FIG. 1 is a side elevational view of a motorcycle according to the present invention.

As shown in FIG. 1, a motorcycle of the present invention generally includes a frame 1 of the double-cradle type, a water-cooled V-type engine 2 mounted on the frame 1 and having engine cylinders spaced longitudinally of the frame 1, a front wheel 3, a front fork 4 by which the front wheel 3 is rotatably supported, a front fender 5, a rear wheel 6, and a rear fork 7 by which the rear wheel 6 is rotatably supported. Although not shown in detail, the rear fork 7 has a front end portion coupled to the frame 1 through a link mechanism and a damper, so that the rear wheel 6 is supported by a progressive link rear suspension system. The motorcycle also includes a chain 8 for transmitting engine power to the rear wheel 6, a steering handlebar 9, a fuel tank 10, a seat or saddle 11, and a side cover 12.

The frame 1 is composed of an upper main frame 13, lower down tubes 14, a seat rail (not shown) extending rearwardly from the main frame 13 and supporting the seat 11, a stay 15 interconnecting a lower portion of the main frame 13 and a rear portion of the seat rail, and a head pipe 16 (see FIG. 2) serving as a front end of the frame 1 and interconnecting the main frame 13 and the down tubes 14.

A front portion of a motorcycle body is surrounded or covered by a fairing 17. The front portion of the motorcycle body is illustrated in detail in FIGS. 2 through 4. A radiator 18, an instrument cluster unit 19, a headlight 20, and other parts are disposed forwardly of the head pipe 16 and attached to an attachment frame 21.

Figure 5:
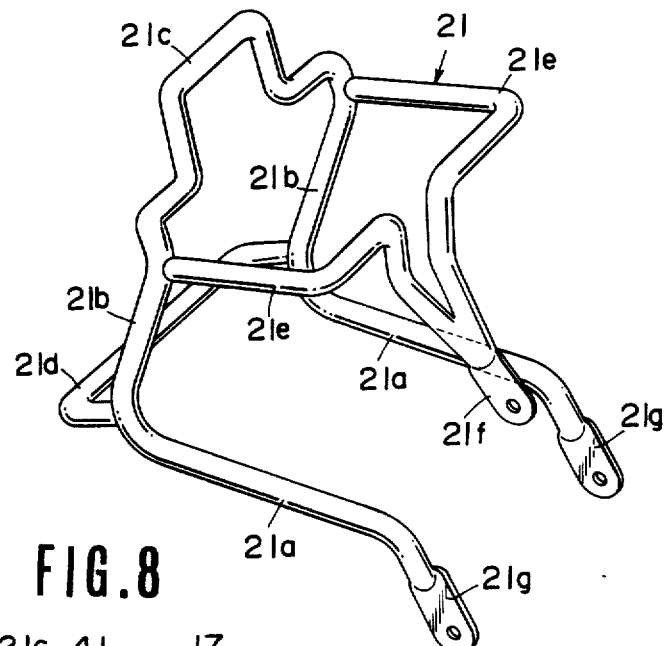
FIG. 5 is a perspective view of an attachment frame.

The attachment frame 21 comprises a system of bent and welded pipes. As illustrated in FIG. 5, the attachment frame 21 includes lower frame portions 21a having raised front portions 21b from which an instrument cluster unit support portion 21c extends contiguously. A headlight support portion 21d is welded to lower ends of the raised front portions 21b, and upper frame portions 21e are welded at front ends to upper ends of the raised front portions 21b. The upper frame portions 21e have rear ends extending laterally toward each other and integrally converging into an attachment plate 21f. The attachment plate 21f is coupled by a bolt to a bracket 22 secured to the head pipe 16. The lower frame portions 21a extend rearwardly and have respective attachment plates 21g at rear ends thereof. The attachment plates 21g are coupled by bolts to attachment members 23 fixed to the down tubes 14.

The front fork 4 is connected by top and bottom bridges 25, 26 to a steering stem 24 rotatably fitted in the head pipe 16. The bottom bridge 26 is integral with a lower end of the steering stem 24.

The radiator 18 in front of the head pipe 16 faces forwardly of the motorcycle body and is positioned in a plane lying substantially parallel to an axis of the head pipe 16 and normally to the longitudinal axis of the motorcycle body. The radiator 18 is mounted on the attachment frame 21 and spaced from the head pipe 16 by a distance which is large enough to allow steering movement of the front fork 4. Since the radiator 18 is located as forwardly of the motorcycle body as possible, fresh air is supplied to the radiator 18 while the motorcycle is running so that the radiator 18 has a higher heat radiation efficiency and is small in size.

The radiator 18 is of the type referred to as a so-called "side-flow" type radiator. As shown in FIGS. 6 and 7, the radiator 18 includes right-hand, and left-hand water tanks 27, 28 spaced transversely across the motorcycle body and extending longitudinally thereof, and water pipe 29 extending parallel to each other in the transverse direction of the motorcycle body and interconnecting the tanks 27, 28. Corrugated heat radiation fins 30 are disposed between the water pipes 29 and fixed thereto. The left-hand tank 28 has an inlet fitting 31 and the right-hand tank 27 has an outlet fitting 32.

With the side-flow type radiator construction, the inlet and outlet fittings 31, 32 may be varied in height within the height of the tanks 27, 28. Therefore, as compared with a down-flow type radiator in which tanks are vertically spaced with fittings disposed on upper and lower ends thereof, a piping to be connected to the radiator of the invention can be varied in vertical position with greater freedom. By positioning the fittings in a relatively wide space within the fairing 17 surrounding the headlight 20, the radiator 18 and the piping connected thereto can be accommodated efficiently and compactly within the fairing 17. Therefore, the radiator 18 and the piping are prevented from projecting extensively and from being exposed from outer sides of the motorcycle body, with the consequences that the resistance imposed by the motorcycle body profile to an air flow is reduced and the appearance is improved.

In the illustrated embodiment, the fitting 31, 32 are positioned close to the vertical centers of the tanks 27, 28. As described hereinbelow, the radiator 18 is dimensioned so that its lower portion will slightly project downwardly beyond the fairing 17 for achieving a desired heat radiating capability. With the fittings 31, 32 located close to the vertical centers of the tanks 27, 28, the fittings 31, 32 are positioned to provide a space within the fairing 17 which is large enough to allow the piping (radiator hoses) connected to the fittings 31, 32 to be neatly and efficiently housed in the fairing 17.

Figure 2:
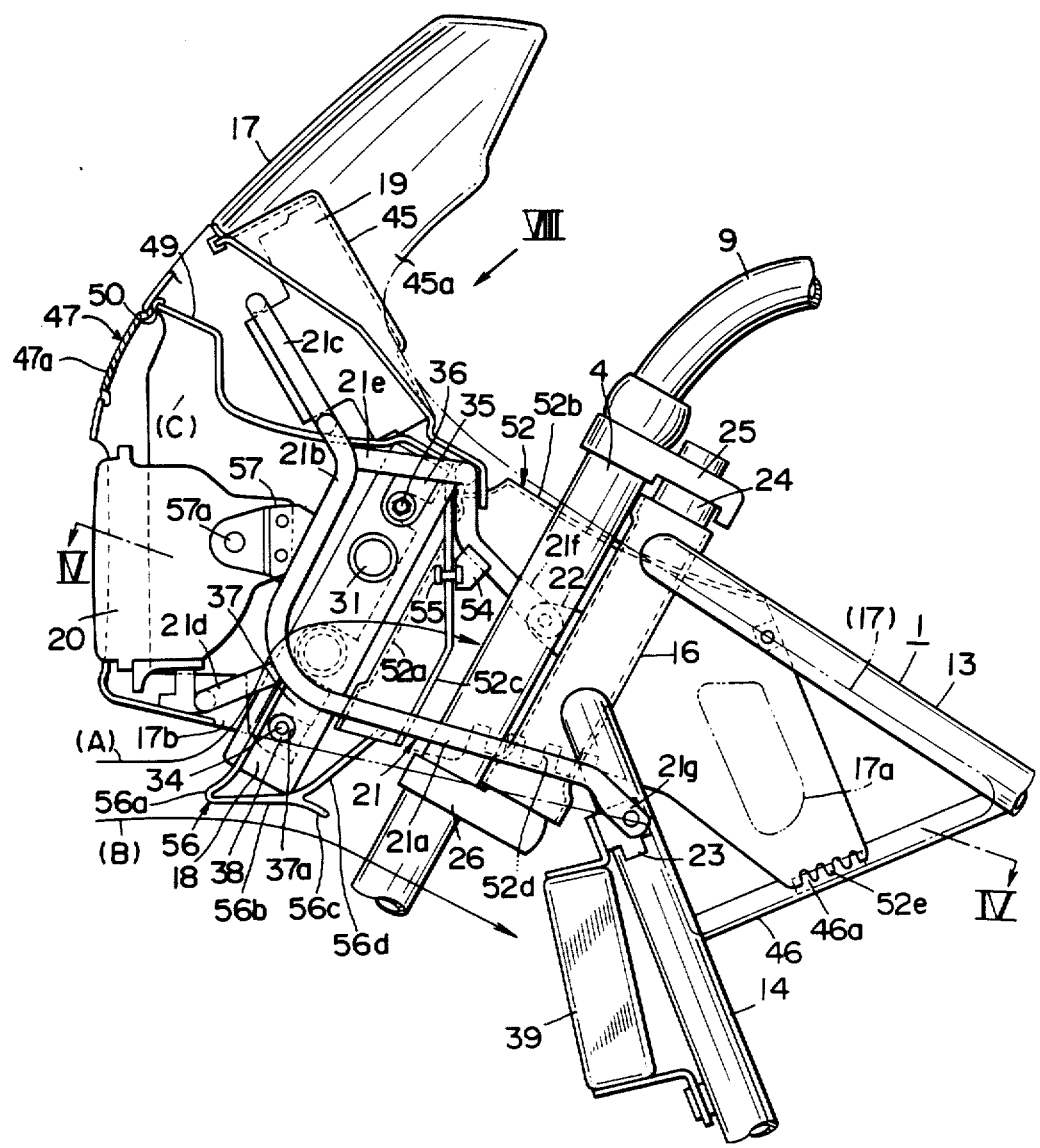
FIG. 2 is a fragmentary side elevational view, partly broken away, of the motorcycle of FIG. 1.

Each of the right-hand and left-hand tanks 27, 28 has an attachment screw hole 33 defined in an upper side thereof and an engagement pin 34 projecting laterally from a lower side thereof. As illustrated in FIG. 2, the radiator 18 is supported on the motorcycle frame 1 by the attachment frame 21, with a bolt 36 extending through a bracket 35 attached to each upper frame portion 21e of the attachment frame 21 threadedly into the attachment screw hole 33 and with the engagement pin 34 fitted through a rubber piece 38 in a semicircular recess 37a defined in a bracket 37 secured to each lower frame portion 21a.

Figure 14:
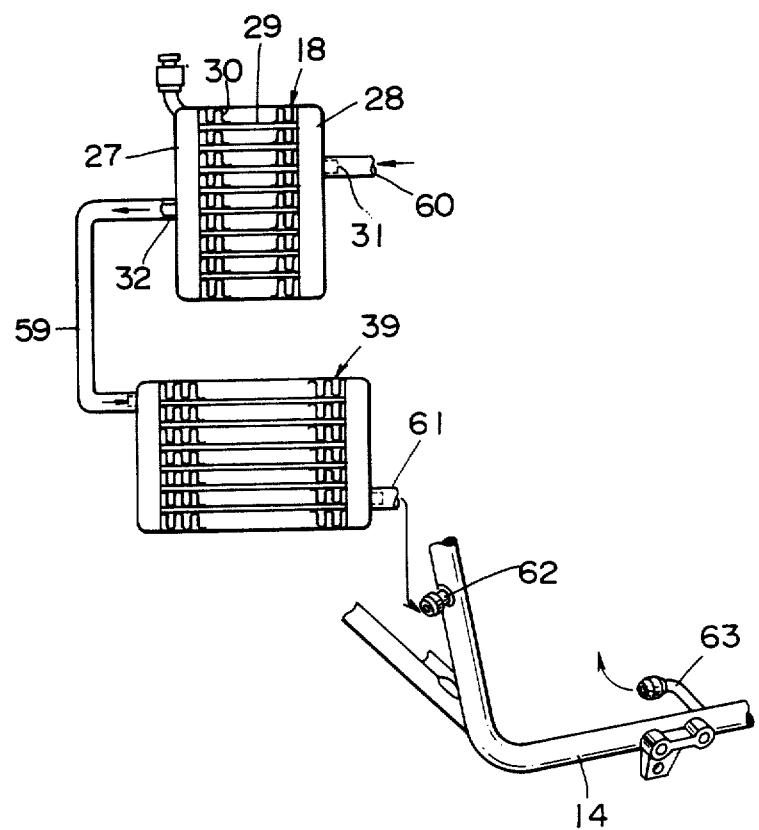
FIG. 14 is a view showing the relationship between two radiators in the motorcycle shown in FIG. 1.

In the present embodiment, another radiator (hereinafter referred to a "lower radiator") 39 is positioned rearwardly and downwardly of the radiator 18 and attached to the down tubes 14. The lower radiator 39 is provided separately for maintaining a desired heat radiating capacity since the upper radiator 18 alone would fail to achieve the desired heat radiating capacity because of its limited size within the space available therefor. The upper and lower radiators 18, 39 are interconnected by a pipe or radiator hose 59 as shown in FIG. 14. The inlet fitting 31 of the radiator 18 is connected via a pipe or radiator hose 60 to a return port of the engine, and an outlet fitting of the lower radiator 39 is connected through a radiator hose 61 and one of the down tubes 14 to a supply port of the engine, thus providing a recirculation path for an engine coolant liquid. To one of the down tubes 14 which serves as a flow passage, there are welded a supply tube 62 and a discharge tube 63 with plugs (not shown) positioned outside of these tubes for closing the flow passage.

Figure 8:
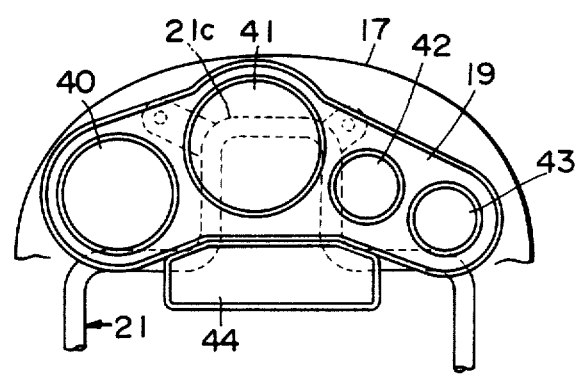
FIG. 8 is a fragmentary view of an instrument cluster unit as viewed in the direction of the arrow VIII of FIG. 2.
Figure 10:
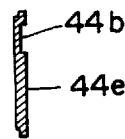
FIG. 10 is a cross-sectional view taken along line X—X of FIG. 9.

The instrument cluster unit 19 extends from above the radiator 18 and is slanted forwardly and upwardly. The instrument cluster unit 19 is mounted on the attachment portion 21c of the attachment frame 21. As illustrated in FIG. 8, the instrument cluster unit 19 comprises pointer indicators 40, 41, 42, 43, and a mechanical digital indicator assembly 44.

The instrument cluster unit 19 is covered with an instrument cover panel 45 extending backward to a position behind an upper portion of the radiator 18 and laterally of the instrument cluster unit 19, the laterally extending portion being indicated at 45a in FIG. 2. The instrument cover panel 45 has a peripheral edge held against an inner surface of the fairing 17.

Since the instrument cover panel 45 not only covers the instruments but extends backward and laterally in covering relation to the radiator 18, the instrument cover panel 45 serves to shield heat radiation emanating upwardly from the radiator 18 to protect the driver from the heat of the radiator 18.

Figure 9:
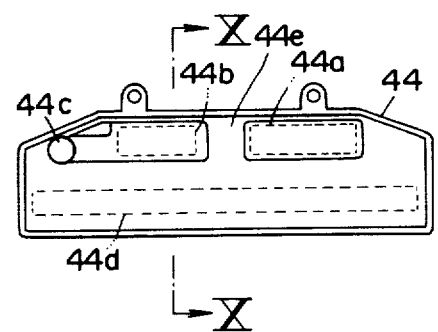
FIG. 9 is an enlarged front elevational view of a digital indicator assembly.

As illustrated in FIG. 9, the digital indicator assembly 44 includes a main odometer 44a, a trip odometer 44b, a reset button 44c for the trip odometer 44b, and another digital indicator 44d. The digital indicator assembly 44 includes a face panel 44e in the form of a transparent plastic panel having thinned-out areas corresponding to the odometers 44a, 44b for allowing indicated characters to be viewed clearly.

The headlight 20 is disposed in a recess having a substantially V shape (opening forwardly) as viewed in side elevation, defined between the radiator 18 and the instrument cluster unit 19. The headlight 20 is mounted on the headlight attachment portion 21d of the attachment frame 21.

Therefore, since not only the radiator 18 but the headlight 20 and the instrument cluster unit 19 are supported on the motorcycle frame, their weight does not act on the front fork 4, thus reducing the inertial force imposed at the time of steering the motorcycle to allow the front wheel 3 to be steered with a smaller force. With the headlight 20 disposed in the V-shaped recess defined between the radiator 18 and the instrument cluster unit 19, these components are arranged in a compact space and the headlight 20 projects from the head pipe 16 by a small distance.

The fairing 17 will be described in greater detail. The fairing 17 serves to cover the radiator 18, the piping (radiator hoses) 59, 60 connected to the radiator 18, the instrument cluster unit 19, and the headlight 20, and extends rearwardly and downwardly on the sides of the motorcycle body. The fairing 17 provides smoother surfaces covering the front fork 4, sides of the head pipe 16, and sides of a triangular section at the front of the motorcycle frame, which is composed of the main frame 13, the down tubes 14, and front stays 46, for reducing the resistance to air flow and improving the appearance of the motorcycle.

Figure 3:
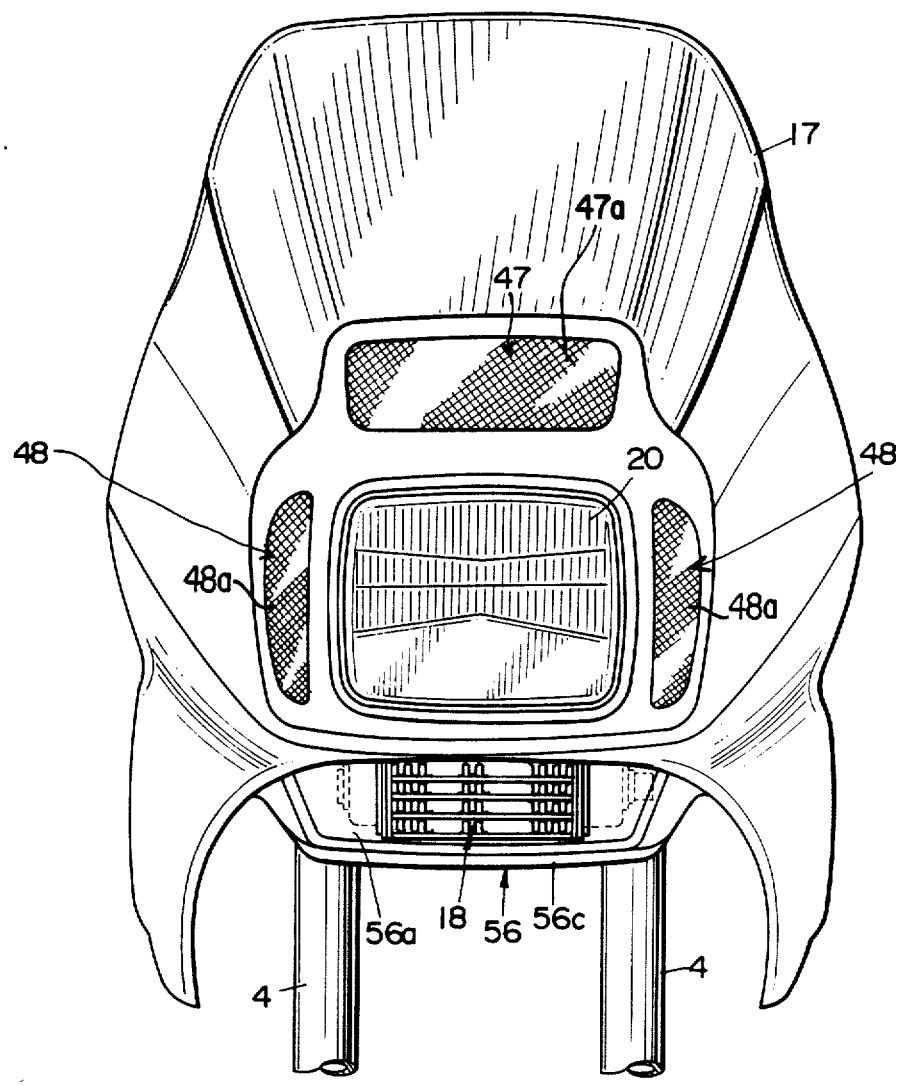
FIG. 3 is a fragmentary front elevational view of the motorcycle of FIG. 1.

As illustrated in FIG. 3, the fairing 17 has an upper open air inlet 47 above the headlight 20 and lateral open air inlets 48 provided laterally of the headlight 20 for introducing air toward the radiator 18. The air inlets 47, 48 have upper and lateral grilles 47a, 48a, respectively.

Figure 11:
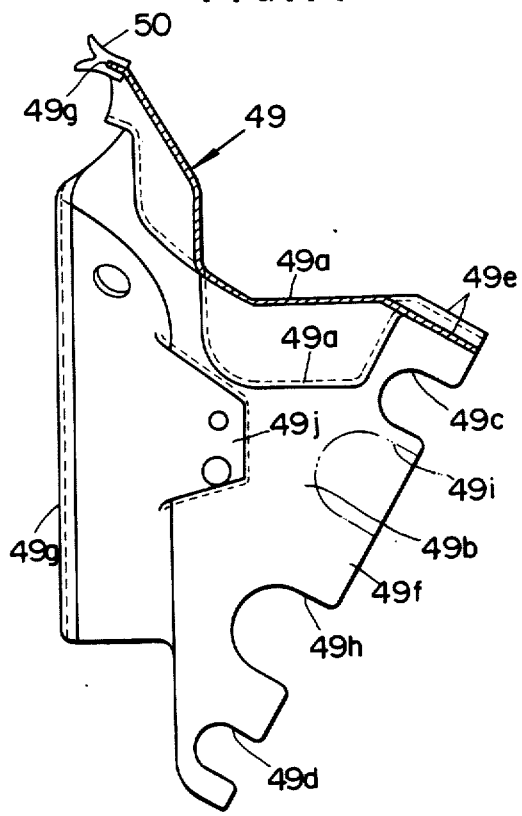
FIG. 11 is a side elevational view, with parts in cross section, of a radiator air guide.
Figure 13:
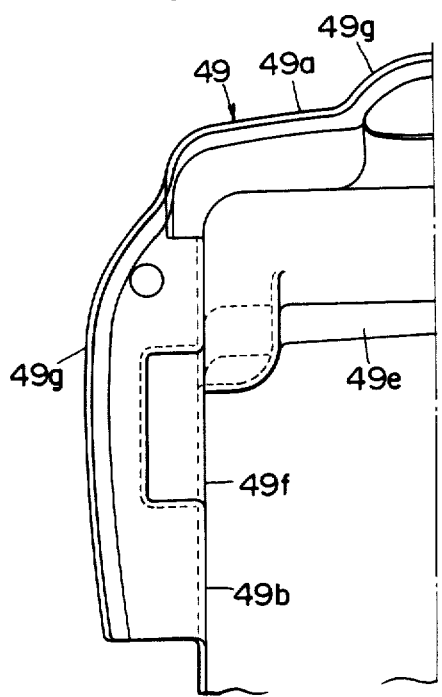
FIG. 13 is a fragmentary front elevational view of the radiator air inlet.
Figure 12:
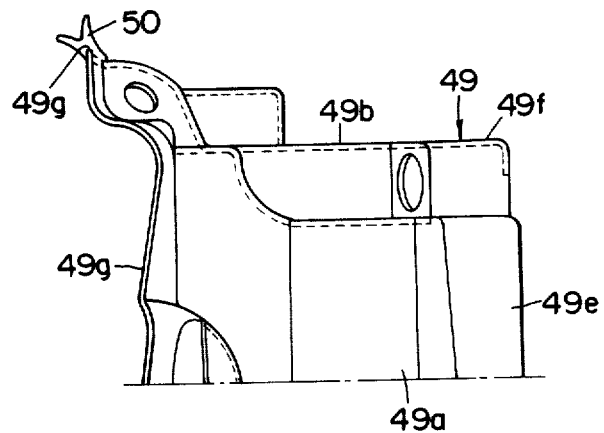
FIG. 12 is a plan view of the radiator air guide of FIG. 11.

As shown in FIG. 2, a radiator air guide 49 is disposed above the headlight 20 and the radiator 18 and below the instrument cluster unit 19. As illustrated in FIGS. 11 through 13, the radiator air guide (hereinafter referred to as an "air guide") 49 has an upper panel 49a and side walls 49b which have rear ends 49e, 49f connected contiguously to and extending around a wall surface of the radiator 18. The air guide 49 has a front end 49g attached through a seal member 50 contiguously to an inner surface of the fairing 17 around the headlight 20. The air guide 49 defines an air guide passage 51 therein for effectively guiding air flowing from the air inlets 47, 48 toward the radiator 18, and also serves to shield heat from the radiator 18 and prevents water from being applied to the instrument cluster unit 19 from therebelow. As illustrated in FIG. 11, the air guide 49 has upper and lower semicircular recesses 49c, 49d defined in a rear edge of each side wall 49b. The bolt 36 and the engagement pin 34 on the side of the radiator 18 are fitted through rubber pieces in the recesses 49c, 49d, so that the air guide 49 and the radiator 18 are supported on the brackets 35, 37. The air guide 49 also has recesses 49h, 49i receiving the outlet fitting 32 and the inlet fitting 31, respectively.

The air guide 49 includes a tongue 49j fastened together with the headlight 20 to a bracket 57 (FIG. 2) fixed to each raised portion 21b of the attachment frame 21. The bracket 57 has a front portion 57a serving as a support for the fairing 17.

Figure 4:
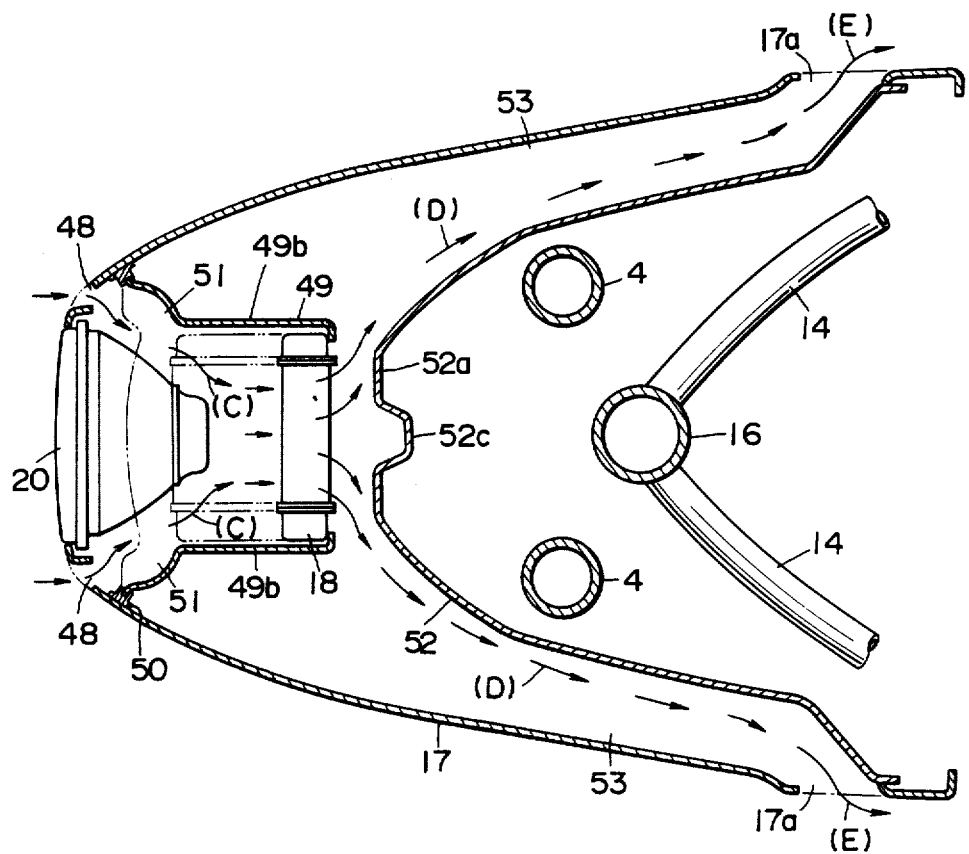
FIG. 4 is a cross-sectional view taken along line IV—IV of FIG. 2.

With the air guide 49 defining the air guide passage 51, air flows in the directions of the arrow (C) as shown in FIGS. 2 and 4 efficiently into the radiator 18 to allow the radiator 18 to radiate heat. The air guide 49 also serves to render the radiation 18 compact in size.

The air guide 49 and the instrument cover panel 45 covers an upper surface of the radiator 18 with a double-walled construction. The air guide 49 and the instrument cover panel 45 define a space therebetween above the radiator 18 for increasing the ability to insulate heat from the radiator 18 to thereby enhance and comfort of the driver while driving the motorcycle.

As shown in FIG. 4, an air guide partition 52 is disposed between the radiator 18 and the head pipe 16 and has a wall 52a of a substantially U shape as viewed in plan for allowing steering movement of the front fork 4. The air guide partition 52 also includes upper panels 52b extending laterally outwardly from upper edges of the wall 52a and held against inner surfaces of the fairing 17. The fairing 17 has outlet holes 17a defined in rear sides thereof. The wall 52a of the air guide partition 52 has rear ends connected to rear marginal edges of the outlet holes 17a. Therefore, the air guide partition 52 and the inner surface of the fairing 17 jointly define air guide passages 53 extending from the rear surface of the radiator 18 toward the outlet ports 17a. The air guide partition 52 has a front recessed portion 52c secured by a bolt 55 (FIG. 2) to a bracket 54 fixed to one of the upper frame portions 21e of the attachment frame 21. The air guide partition 52 also has fingers 52d formed on lower edges thereof and extending alternately outwardly and inwardly, the fingers 52d gripping the lower frame portions 21a of the attachment frame 21. The air guide partition 52 additionally has similar fingers 52e formed on rear lower edges thereof and gripping attachment plates 46a are mounted on the front stays 46.

The air guide partition 52 serves to guide an air flow passing through the radiator 18 to flow into the laterally spaced air guide passages 53, from which the air flows are discharged through the outlet holes 17a. Therefore, the air guide partition 52 prevents hot air passing through the radiator 18 from being applied to the driver and also greatly reduces the resistance to the air flows. More specifically, if the air flow were directed directly behind the radiator 18, then the air flow would be subjected to an increased resistance due to various components such as the engine 2. With the arrangement of the invention, however, the resistance to the air flow can be reduced since the air flow from the radiator 18 is guided by the air guide passages 52 to go in the directions of the arrows (D) and be discharged smoothly out of the outlet holes 17a in the directions of the arrows (E).

The radiator 18 projects downwardly from a lower opening 17b in the fairing 17 because the radiator 18 is required to be of such dimensions as to provide a desired heat radiation capability. A lower radiation cover 56 is attached to the lower frame portions 21a of the attachment frame 21 in covering relation to the projecting portion of the radiator 18. The lower radiator cover 56 includes front guide wings 56a lying below and alongside of the radiator 18, with an opening defined only in front of the radiator 18. The radiator cover 56 thus has a smooth recessed surface having such a curvature as to guide air upwardly toward the radiator 18. The under radiator cover 56 has a substantially horizontal lower surface 56b followed by a rear flow-directing wing 56c curved slightly downwardly and having a smooth curvature for guiding an air flow toward the lower radiator 39.

The lower radiator cover 56 serves to guide an air flow with the guide wings 56a to flow through the air inlet opening 17b toward the radiator 18 in the direction of the arrow (A). The lower radiator cover 56 is therefore capable of applying more air toward the radiator 18 than would be possible with no such lower radiator cover, thereby improving the air trapping efficiency. The air flow running along the lower surface 56b of the lower radiator cover 56 is guided by the flow-directing wing 56c to be directed downwardly as indicated by the arrow (B) toward the lower radiator 39, which will have an increased heat radiating capability.

The flow-directing wing 56c is also effective to prevent the air from flowing from the lower surface 56b onto a rear surface 56d and hence prevent air vortices from being generated, so that the resistance to the air flow can be reduced.

In the above embodiment the radiator 18 projects downwardly from the lower edges of the fairing 17.

However, the radiator 18 may not project downwardly beyond the lower edges of the fairing 17. Even with such an alternative, however, the guide wings 56a may be provided for effectively introducing an upward air flow toward the radiator 18.

While in the illustrated embodiment the lower radiator cover 56 is mounted on the attachment frame 21, the lower radiator cover 56 may alternatively be mounted directly on a lower portion of the radiator 18.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

What is claimed is:

1. A motorcycle comprising:
   (a) a motorcycle body having a longitudinal axis;
   (b) a motorcycle frame;
   (c) a head pipe fixedly mounted on a front end of said motorcycle frame and inclined rearwardly with respect to a vertical line;
   (d) a radiator disposed forwardly of said head pipe substantially parallel to an axis thereof and positioned in a plane lying normally to the longitudinal axis of said motorcycle body;
   (e) an instrument cluster unit disposed in a slanted plane extending upwardly and forwardly from above said radiator;
   (f) a headlight disposed in a recess defined between said instrument cluster unit and said radiator, said recess having a substantially V shape as viewed in side elevation, and said headlight being disposed forwardly of said radiator in front of said head pipe;
   (g) a fairing covering said headlight, said radiator, and said instrument cluster unit; and
   (h) a single attachment frame by which said radiator, said instrument cluster unit, and said headlight are supported on said motorcycle frame.

2. A motorcycle according to claim 1, wherein said radiator comprises a pair of water tanks spaced transversely of said motorcycle body, and a plurality of water pipes extending transversely of said motorcycle body between said water tanks and horizontally parallel to each other and interconnecting said water tanks; and one of said water tanks includes an inlet fitting positioned close to its vertical center and the other of said water tanks includes an outlet fitting positioned close to its vertical center.

3. A motorcycle according to claim 2, wherein said water tanks have substantially vertical longitudinal axes, each water tank having water inlet and outlet ports in vertical spaced locations.

4. A motorcycle according to claim 1, including a front fork supported on said head pipe for angular movement about said head pipe, said radiator being spaced from said head pipe by a distance which allows the angular movement of said front fork.

5. A motorcycle according to claim 1, wherin said fairing has air inlets disposed around said headlight.

6. A motorcycle according to claim 5, wherein said fairing includes a first air guide defining a first air guide passage for guiding air from said air inlets toward said radiator, said first air guide having a front end held contiguously against an inner surface of said fairing around said headlight and a rear end held contiguously against a surrounding wall surface of said radiator.

7. A motorcycle according to claim 6, wherein said air inlets are defined in said fairing above and laterally of said headlight, said first air guide comprising an upper panel positioned above said headlight and said radiator and side walls disposed laterally of said headlight and integral with said upper panel.

8. A motorcycle according to claim 1, wherein said fairing has a lower opening, including a guide wing disposed around a lower, downwardly facing portion of said radiator for guiding air entering through said lower opening toward said radiator.

9. A motorcycle according to claim 8, wherein said lower, downwardly facing portion of said radiator projects downwardly from said fairing.

10. A motorcycle comprising:
    (a) a motorcycle body having a longitudinal axis;
    (b) a motorcycle frame;
    (c) a head pipe fixedly mounted on a front end of said motorcycle frame and inclined rearwardly with respect to a vertical line;
    (d) a radiator disposed forwardly of said head pipe substantially parallel to an axis thereof and positioned in a plane lying normally to the longitudinal axis of said motorcycle body;
    (e) an instrument cluster unit disposed in a slanted plane extending upwardly and forwardly from above said radiator;
    (f) a headlight disposed in a recess defined between said instrument cluster unit and said radiator, said recess having a substantially V shape as viewed in side elevation; and
    (g) a fairing covering said headlight, said radiator, and said instrument cluster unit;
    said fairing having air inlets disposed around said headlight;
    said fairing including a first air guide defining a air guide passage for guiding air from said air inlets toward said radiator, said first air guide having a front end held contiguously against an inner surface of said fairing around said headlight and a rear end held contiguously against a surrounding wall surface of said radiator; and
    said fairing having outlet ports disposed laterally and rearwardly of said radiator, said fairing including a second air guide defining, with the inner surface of said fairing, a second air guide passage for guiding an air flow passing through said radiator toward said outlet ports, said second air guide having a wall portion of a substantially U shape as viewed in plan, which extends rearwardly from a position immediately behind said radiator along opposite inner side wall surfaces of said fairing.

11. A motorcycle according to claim 10, wherein said second air guide extends as a partition between said radiator and said fairing, and said head pipe.

12. A motorcycle comprising:
    (a) a motorcycle body having a longitudinal axis;
    (b) a motorcycle frame including a pair of down tubes;
    (c) a head pipe fixedly mounted on a front end of said motorcycle frame and inclined rearwardly with respect to a vertical line;
    (d) an upper radiator disposed forwardly of said head pipe substantially parallel to an axis thereof and positioned in a plane lying normally to the longitudinal axis of said motorcycle body;

(e) an instrument cluster unit disposed in a slanted plane extending upwardly and forwardly from above said radiator;

(f) a headlight disposed in a recess defined between said instrument cluster unit and said upper radiator, said recess having a substantially V shape as viewed in side elevation;

(g) a fairing covering said headlight, said upper radiator, and said instrument cluster unit;

(h) a single attachment frame by which said upper radiator, said instrument cluster unit, and said headlight are supported on said motorcycle frame; and (i) a lower radiator connected to said down tubes at a position below said fairing, said lower radiator communicating with said upper radiator.

* * * * *

UNITED STATES PATENT AND TRADEMARK OFFICE
CERTIFICATE OF CORRECTION

PATENT NO. : 4,709,774
DATED : December 1, 1987
INVENTOR(S) : Saito et al.

It is certified that error appears in the above-identified patent and that said Letters Patent is hereby corrected as shown below:

```
Column 3, line 27, change "pipe" to --pipes;
         line 51, change "fitting" to --fittings--.
Column 4, line 7, change "a" to --as the--.
Column 5, line 8, change "smoother" to --smooth--;
         line 53, change "radiation" to --radiator--;
         line 59, change "and" to --the--.
Column 6, line 30, change "52" to --53--;
         line 36, change "radiation" to --radiator--;
         line 45, change "under" to --lower--.
Column 7, line 1, change "may" to --should--;
         line 64 (claim 5, line 1), change "wherin"
to --wherein--.
Column 8, line 40 (claim 10, line 22) after "defining
a" insert --first--.
```

Signed and Sealed this

Fourteenth Day of June, 1988

Attest:

DONALD J. QUIGG

Attesting Officer      Commissioner of Patents and Trademarks